Jan. 17, 1967  J. F. KOPCZYNSKI  3,298,314
FLUID MOVING DEVICE
Filed Jan. 29, 1965  2 Sheets-Sheet 1
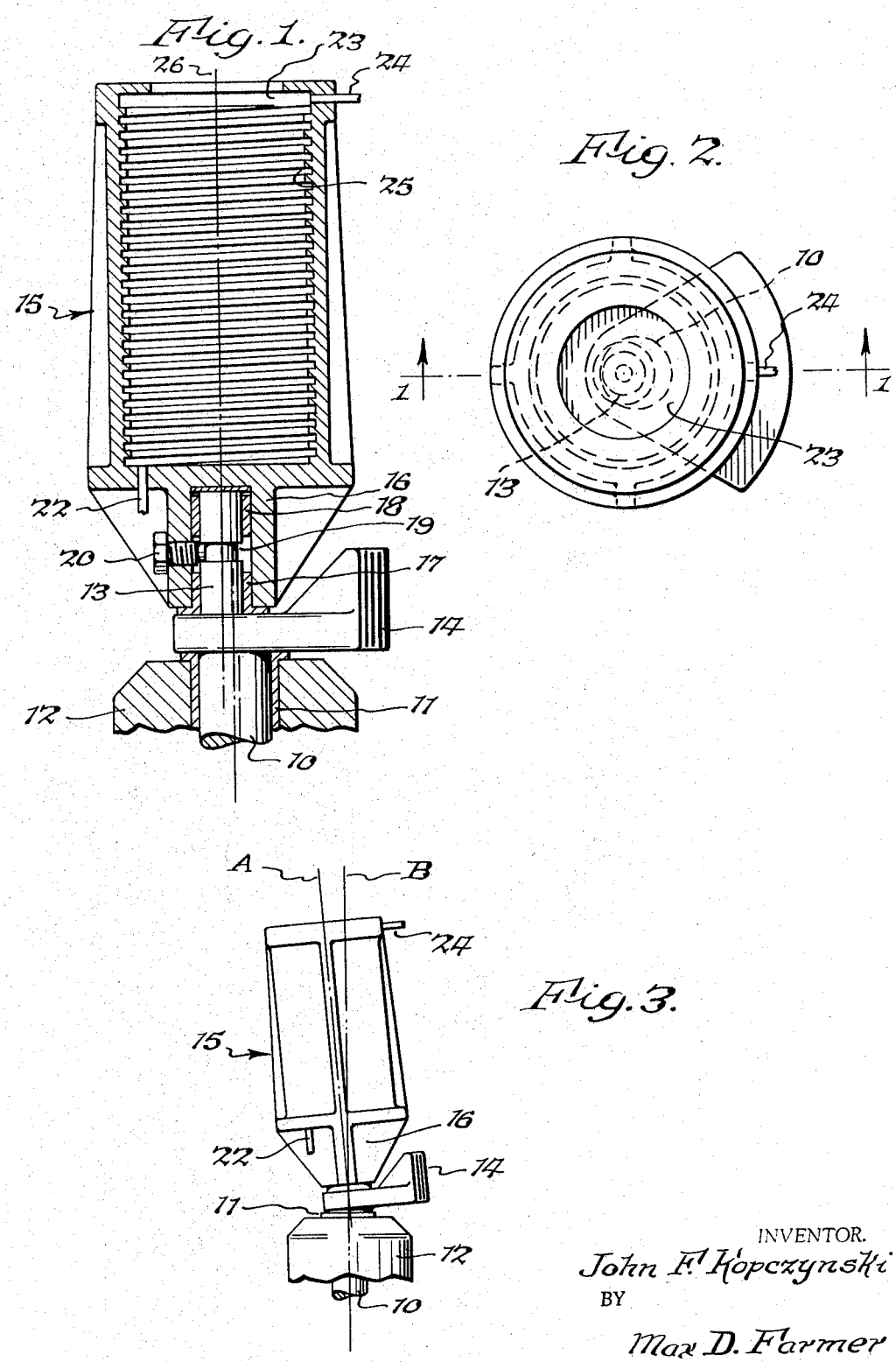
INVENTOR.
John F. Kopczynski
BY
Max D. Farmer
ATTORNEY.

INVENTOR.
John F. Kopczynski
BY
Max D. Farmer
ATTORNEY.

3,298,314
FLUID MOVING DEVICE
John F. Kopczynski, 1671 Sweeney St.,
North Tonawanda, N.Y. 14120
Filed Jan. 29, 1965, Ser. No. 429,087
11 Claims. (Cl. 103—1)

This invention relates to devices for moving fluids in a selected direction continuously and which is particularly useful for moving liquids at high speeds.

An object of this invention is to provide a simple, practical, novel and relatively inexpensive device for moving fluids at high speeds from one position to another, which may be operated continuously for long periods, which may safely handle corrosive fluids, and which requires a minimum of power for operation.

Other objects and advantages will appear from the following description of some embodiments of the invention, and the novel features will be particularly pointed out in the appended claims.

In the accompanying drawings:

FIG. 1 is a sectional elevation of a device constructed in accordance with this invention and illustrating one embodiment thereof, the section being taken approximately along the line 1—1 of FIG. 2, but with the counterbalance and shaft in elevation;

FIG. 2 is a plan of the same;

FIG. 3 is a side elevation of another device also constructed in accordance with the invention, but illustrating another embodiment thereof;

Figure 4:
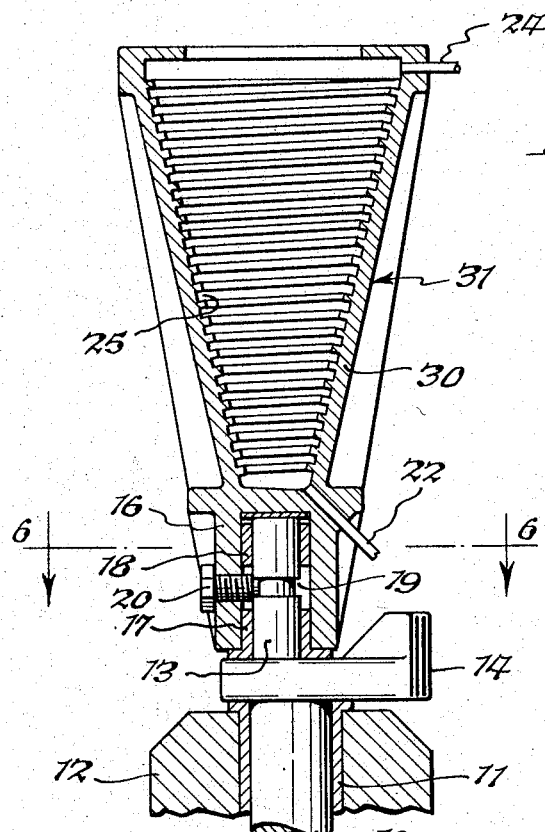
FIG. 4 is a sectional elevation somewhat similar to FIG. 1 but illustrating another embodiment of the invention.

In the embodiment illustrated in FIGS. 1 and 2, an upright shaft 10 is mounted for rotation on its axis in a bearing 11 provided in a support or base 12. At its upper end the shaft is machined eccentrically of its axis to provide a cylindrical pin 13 whose axis is eccentric to the axis of the shaft 10. A counterweight 14 is fixed on the pin 13 to rotate thereon, with bearing liners 17 and 18 rotation with the pin and shaft. A tubular or hollow housing 15 has a depending sleeve 16 that telescopes over the pi n13 to rotate thereon, with bearing liners 1 7and 18 on the pin within the sleeve. The pin 10 has an annular groove 19 in its periphery, intermediate of its ends and between the bearing liners 17 and 18. A screw 20 is threaded through the sleeve 16 with its inner end engaged removably in the groove 19 to confine the housing removably on the pin, while permitting limited relative rotation of the housing and the pin.

A flexible fluid inlet pipe 22 is connected to the interior of chamber 23 of the housing adjacent one end thereof and a flexible fluid outlet pipe 24 is connected to chamber 23 adjacent the other end thereof. The inner peripheral side wall of the housing is provided with a groove or channel 25 that progresses spirally between the inlet 22 and outlet 24 and is open toward the center axis of the chamber. The side walls of the groove act as vanes that force any fluid in contact with them progressively between the inlet and outlet connections, the direction of such progression depending upon the direction of rotation of the housing.

Figure 6:
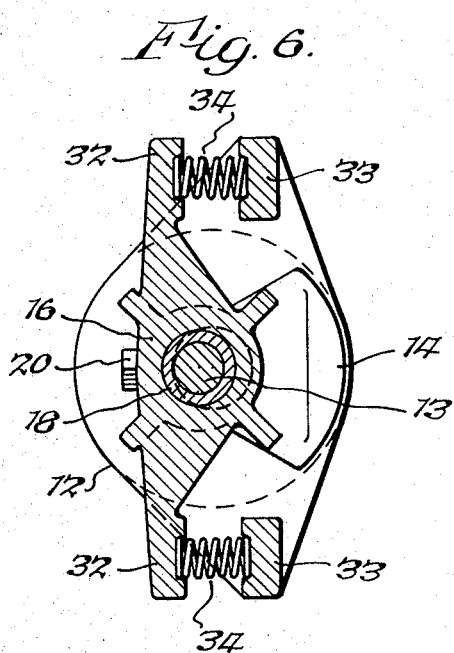
FIG. 6 is a sectional plan of the embodiment shown in FIG. 4, the section being taken approximately along the line 6—6 of FIG. 4, but which plan also is the same for similar sectional plans of the embodiments shown in FIGS. 1–3 and 5.

In the operation of the example of the invention shown in FIGS. 1 and 2, a motor or other source of motive power (not shown) is connected to the shaft 10 to rotate it about its longitudinal axis 26—26. The pin 13 on the end of the shaft will, in rotating with the shaft and due to its eccentricity with respect to the shaft, move in a small loop or gyratory path. The inlet 22 and outlet 24 hold the housing against complete rotation while it gyrates with the pin 13, the inlet and outlet connections being flexible hoses to permit of such gyration without complete rotation of the housing. The housing is also preferably held from rotation by a construction such as shown in FIG. 6 as will be explained in connection with FIG. 4 later herein. During this gyration of the housing, the fluid passing therethrough between the inlet and outlet will be swirled by the motion around the side wall of the chamber which is the inner peripheral wall of the housing, and in so swirling the grooves will propel the fluid along the length of the chamber between the inlet and outlet and thus propel it along a selected path. When liquids are so propelled it is unnecessary for the top of the housing to be closed. The speed of swirling will be much faster than the rate of rotation of the shaft 10. If the housing is full of liquid the spiral groove will also propel it between the inlet and outlet. The counterweight, being fixed on the eccentric pin, it is positioned angularly on the pin to counterbalance the housing in its gyrations.

In the example of the invention shown in FIG. 3, the construction is the same as described and shown in connection with FIGS. 1 and 2 except that the eccentric pin on the upper end of the shaft makes an acute angle with the axis of rotation of the shaft, as indicated by lines A–B, and the groove in the peripheral wall of the housing is not necessary yet useful to propel the liquid since the liquid will swirl up the inclined inner wall of the chamber.

In the example of the invention shown in FIG. 4 the construction is the same as for FIGS. 1 and 2, except that the chamber 30 of the housing 31 instead of being cylindrical as in FIGS. 1 and 2, has the shape of an inverted cone frustum between the inlet 22 and outlet 24. Because of the inclined inner side wall of the chamber 30, the swirling liquid will move up this inclined wall without the spiral channel, but the channel 25 is also preferably used to make the propelling action more positive. As shown in FIG. 6, the sleeve 16 has arms or wings 32 extending from opposite sides beyond the path of travel of the outer periphery of the counterweight. The base or support 12 has upstanding lugs or posts 33 aligned with the free ends of the arms or wings 32, and a compression spring 34 is compressed between each post 33 and the adjacent end of an arm or wing 32. The faces of the posts 33 and the ends of the arms or wings 32 against which the ends of springs 34 abut, are recessed to receive the ends of the springs and prevent their displacement from the positions shown. During gyration of the sleeve 16 with the housing, the arms or wings 32 will follow an identical path or movement which is circular and gyratory, so they alternately compress and relax the springs 34 while they (the springs) also move sideways following the same circular movement path as do the arms or wings 32 and the sleeve 16 of the housing. The springs absorb energy while being compressed but give it back while extending, and at the same time prevent rotation of the housing about its axis or crank shaft, because the posts 33 are stationary.

Figure 5:
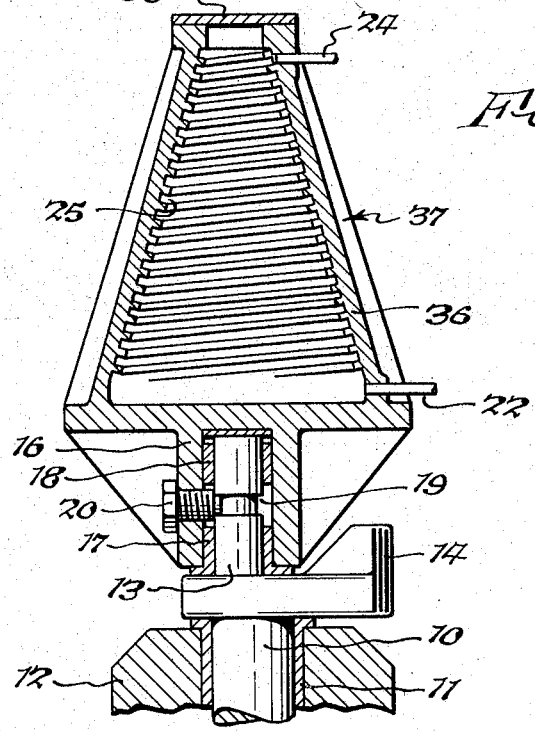
FIG. 5 is a sectional elevation somewhat similar to FIGS. 1 and 4 but illustrating another embodiment of the invention.

In the example of the invention shown in FIG. 5, the construction is similar to that described for FIG. 4, except that the chamber 36 of the housing 37 has the shape of an upright frustum of a cone and the top is closed by a cover 38. In this example, the spiral groove 25 on the peripheral wall of the housing chamber 36 is employed in order to propel the liquid upwardly in the chamber. While the means shown in FIG. 6 is illustrated as a sectional plan taken along the line 6—6 of FIG. 4, it corresponds to the construction of the other examples of the invention in FIGS. 1, 2, 3 and 5 when the section of FIG. 6 is taken along lines corresponding to 6—6 in the other examples of the invention.

It will be understood that a motor or other source of motive power will be connected to the upright shaft 10 in each example of the invention. Due to the gyratory movement of the housing it will move fluids and particularly liquids at high speeds with relatively low operating power, and at relatively low speeds of operation of the upright shaft.

It will be further understood that various changes in the materials, details and arrangements of parts, which have been herein described and illustrated in order to explain the nature of the invention, may be made by those skilled in the art within the principle and scope of the invention as expressed in the appended claims.

I claim:

1. A liquid moving device comprising:
   (a) an upstanding housing having a chamber with a closed lower end, with a spiral vane on the side wall of the chamber that extends progresesively from near the bottom of the chamber upwardly to near the top of the chamber, and also having an inlet connection for liquids to the lower part of the chamber and an outlet connection for the liquid from near the top of the chamber,
   (b) a shaft mounted for rotation about its axis in one direction and having an eccentric connection to said housing and causing sidewise, cyclic bodily movements of the housing when the shaft rotates,
   (c) said vane progressing upwardly in a direction that propels any liquid in contact with it upwardly when the shaft rotates in said one direction, and
   (d) said housing being held against rotation with the shaft by said inlet and outlet connections.

2. The device according to claim 1, wherein said side wall of said chamber is upwardly divergent between said connections.

3. The device according to claim 1 wherein said vane is created by a channel groove in the side wall of the chamber that is open into the chamber along its length.

4. A liquid moving device comprising:
   (a) a support,
   (b) an upstanding shaft mounted on said support for rotation about its axis and terminating at its upper end in a pin whose axis is eccentric to the axis of rotation of the shaft,
   (c) an upstanding housing having a chamber closed at its lower end and a depending boss that telescopes over and is rotatable on said pin, and which supports the housing,
   (d) means for detachably confining said housing on said pin while said pin is free to rotate in said boss,
   (e) said housing having an inlet connection for a liquid opening into the lower part of said chamber and an outlet connection for a liquid opening into the upper part of said chamber, said connections preventing rotation of said housing with said shaft.

5. The device according to claim 4 and additional means for also holding the housing against rotation with the shaft.

6. The device according to claim 4, wherein said housing has a spiral vane on the side wall of its said chamber that progresses upwardly from near the inlet connection to near the outlet connection and having a direction of spiral that when the shaft rotates in one direction the vane will propel any liquid in the chamber upwardly toward said outlet connection.

7. The device according to claim 4, wherein said housing has a spiral vane on the side wall of its said chamber that progresses upwardly from near the inlet connection to near the outlet connection and having a direction of spiral that when the shaft rotates in one direction the vane will propel any liquid in the chamber upwardly toward said outlet connection, and the diameter horizontally of the chamber varies progresively from end to end.

8. The device according to claim 4, wherein said housing has a spiral vane on the side wall of its said chamber that progresses upwardly from near the inlet connection to near the outlet connection and having a direction of spiral that when the shaft rotates in one direction the vane will propel any liquid in the chamber upwardly toward said outlet connection, and the upstanding axis of the chamber makes a small acute angle to the axis of said shaft.

9. The device according to claim 4, and a counterbalance fixed on said pin near its junction with the body of the shaft for rotation with the shaft.

10. The device according to claim 4, wherein the side wall of said chamber is upwardly divergent.

11. The device according to claim 4, wherein the side wall of said chamber is upwardly divergent and has a vane that progresses spirally upwardly from near said inlet connection to near said outlet connection and has a direction of spiral that when the shaft rotates in one direction the vane will propel any liquid in the chamber upwardly toward said outlet connection.

References Cited by the Examiner

UNITED STATES PATENTS

| 403,989 | 5/1889 | Coxe | 74—86 |
| 428,908 | 5/1890 | Haggenmacher | 209—332 |
| 507,756 | 10/1893 | Schnelle | 209—332 |
| 597,412 | 1/1898 | Hintz | 209—332 |

FOREIGN PATENTS 486,575  11/1929  Germany.

LAURENCE V. EFNER, *Primary Examiner.*